(12) United States Patent
Cofler et al.

(10) Patent No.: US 6,807,626 B1
(45) Date of Patent: Oct. 19, 2004

(54) EXECUTION OF A COMPUTER PROGRAM

(75) Inventors: Andrew Cofler, Voreppe (FR);
Stéphane Bouvier, Sassenage (FR);
Bruno Fel, Voreppe (FR); Laurent Ducousso, Sain Nazaire les Eymes (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/563,702

(22) Filed: May 2, 2000

(30) Foreign Application Priority Data

May 3, 1999 (EP) .............................. 99410048

(51) Int. Cl.$^7$ .............................. G06F 9/44; G06F 9/38; G06F 9/22
(52) U.S. Cl. ...................... 712/228; 712/229; 712/243; 712/213; 712/227
(58) Field of Search ................................ 709/100, 108; 710/307, 66; 712/245, 243, 213, 228, 227, 209, 210, 229, 35, 23, 24

(56) References Cited

U.S. PATENT DOCUMENTS

| | | | | |
|---|---|---|---|---|
| 4,833,640 A | * | 5/1989 | Baba | 709/108 |
| 5,652,900 A | * | 7/1997 | Yoshida | 709/100 |
| 5,826,089 A | | 10/1998 | Ireton | 717/146 |
| 6,553,478 B1 | * | 4/2003 | Grossier | 711/209 |

FOREIGN PATENT DOCUMENTS

| | | |
|---|---|---|
| EP | 0 862 111 | 9/1998 |
| WO | WO 93/20507 | 10/1993 |
| WO | WO 9713201 | 4/1997 |

OTHER PUBLICATIONS

European Search Report from European Application No. 99410048, filed May 3, 1999.
U.S. patent application Ser. No. 09/562,551, Cofler et al., filed May 2, 2000.
U.S. patent application Ser. No. 09/562,542, Wojcieszak et al., filed May 2, 2000.
U.S. patent application Ser. No. 09/562,717, Wojcieszak et al., filed May 2, 2000.
U.S. patent application Ser. No. 09/562,718, Wojcicszak et al., filed May 2, 2000.
U.S. patent application Ser. No. 09/563,475, Cofler et al., filed May 2, 2000.
U.S. patent application Ser. No. 09/562,715, Wojcieszak et al., filed May 2, 2000.
U.S. patent application Ser. No. 09/563,610, Wojcieszak et al., filed May 2, 2000.
U.S. patent application Ser. No. 09/563,703, Uguen et al., filed May 2, 2000.
U.S. patent application Ser. No. 09/563,154, Cofler et al., filed May 2, 2000.
U.S. patent application Ser. No. 09/563,704, Cofler et al., filed May 2, 2000.
U.S. patent application Ser. No. 09/563,315, Grossier, filed May 2, 2000.

(List continued on next page.)

*Primary Examiner*—Daniel H. Pan
(74) *Attorney, Agent, or Firm*—Lisa K. Jorgenson; James H. Morris; Wolf, Greenfield & Sacks, P.C.

(57) ABSTRACT

A computer system has a memory which holds a computer program consisting of a sequence of program instructions. The format of the program instructions depends on an instruction mode of the computer system. A decoder is arranged to receive and decode program instructions. A microinstruction generator is responsive to information from the decoder to generate microinstructions according to a predetermined microinstruction format which is independent of the instruction mode of the computer system. The computer system has a plurality of parallel execution units for receiving and executing the microinstructions.

13 Claims, 4 Drawing Sheets

OTHER PUBLICATIONS

U.S. patent appliaction Ser. No. 09/561,629, Grossier, filed May 2, 2000.
U.S. patent application Ser. No. 09/563,473, Bernard, filed May 2, 2000.
U.S. patent application Ser. No. 09/563,186, Alofs, filed May 2, 2000.
U.S. patent application Ser. No. 09/563,477, Cousin, filed May 2, 2000.
U.S. patent application Ser. No. 09/563,634, Cofler et al., filed May 2, 2000.
U.S. patent application Ser. No. 09/563,153, Debbagh et al., filed May 2, 2000.

* cited by examiner

EXECUTION OF A COMPUTER PROGRAM

FIELD OF THE INVENTION

The present invention relates to a method of executing a computer program and to a computer system.

BACKGROUND TO THE INVENTION

A computer system is described which comprises a plurality of parallel execution units which are responsible for carrying out the operations defined in a computer program. The computer program consists of a sequence of program instructions. In the computer system described herein, the format of the program instructions is selectable in dependence on an instruction mode of the computer system. The computer system can operate in a number of different instruction modes (three in the described example). It is desirable however that the execution units can execute instructions independently of the operational mode of the computer system.

SUMMARY OF THE INVENTION

To achieve this, the present invention provides a computer system comprising: a memory holding a computer program consisting of a sequence of program instructions, the format of the program instructions being selectable in dependence on an instruction mode of the computer system; a decoder arranged to receive and decode program instructions from the memory; a microinstruction generator responsive to information from the decoder to generate microinstructions according to a predetermined microinstruction format having a plurality of fields of respectively fixed lengths allocated to hold certain data derived from the program instructions, the microinstruction format being independent of the instruction mode of the computer system; and a plurality of parallel execution units for receiving and executing said microinstructions.

Another aspect of the invention provides a method of executing a computer program consisting of a sequence of program instructions held in a memory of a computer system, wherein the format of the program instructions is selectable in dependence on an instruction mode of the computer system, the method comprising: decoding said program instructions; generating microinstructions responsive to information from the decoded program instructions according to a predetermined microinstruction format having a plurality of fields of respectively fixed length allocated to hold certain data derived from the program instructions, the microinstruction format being independent of the instruction mode of the computer system; and supplying said microinstructions to one or more of a plurality of parallel execution units for receiving and executing said microinstructions.

In the particular computer system described herein, the execution units comprise a first set of execution pipelines for use in executing microinstructions needed for memory access operations and a second set of execution pipelines arranged to carry out arithmetic operations thereby providing decoupling of memory access operations from arithmetic operations. This is particularly suited to provide a high digital signal processing performance.

Preferably there is a first microinstruction format for use for microinstructions supplied to the first set of execution pipelines and a second microinstruction format for use for microinstructions supplied to the second set of execution pipelines.

The microinstructions sent to the execution units have a plurality of different fields of respectively fixed lengths.

These fields hold data derived from the program instructions, including for example register names and their validity bits, opcodes, source guards, destination guards etc. Source guards and destination guards relate to a mechanism for executing guarded instructions which is not described further herein.

Some program instructions include an immediate value, which in an actual embodiment can be up to 25 bits for address unit instructions and 16 bits for data unit instructions. In many cases, these immediate values need to be supplied to the execution units for use in execution of the microinstructions. Prior to execution by the execution units, the microinstructions can be held in instruction queues associated respectively with the execution units. The size of the queues depends on the size of the microinstructions. If the microinstructions had a field specifically allocated to receive the immediate value, and had the maximum length possible for the immediate value, then the size of these queues, and also the size of the silicon needed to implement the computer system, would increase. Moreover, for much of the time these fields would remain unused.

Therefore, an additional aspect of the present invention is to provide that the microinstruction generator locates the immediate value in the microinstructions in one or more of said fixed length fields in place of the data normally allocated to the fields. In a program instruction using an immediate value, this immediate value takes the place of other data in the program instruction, for example register values. Thus, these fields of the microinstruction become available for holding the immediate value. Valid fields of the microinstruction never contain an immediate value.

The computer system can operate in one of a number of instruction modes, as mentioned above. The number of microinstructions generated in each machine cycle varies in dependence on the instruction mode of the computer system. In a computer system having four parallel execution units, a maximum of four microinstructions is generated per machine cycle.

The computer system can have a prefetcher for fetching instructions from the memory and supplying them to the decoder. The prefetcher is controlled so that the number and length of instructions fetched from the memory in each machine cycle depends on the instruction mode of the computer system.

For a better understanding of the present invention and to show how the same may be carried into effect, reference will now be made by way of example to the accompanying drawings.

DESCRIPTION OF THE PREFERRED EMBODIMENT

Figure 1:
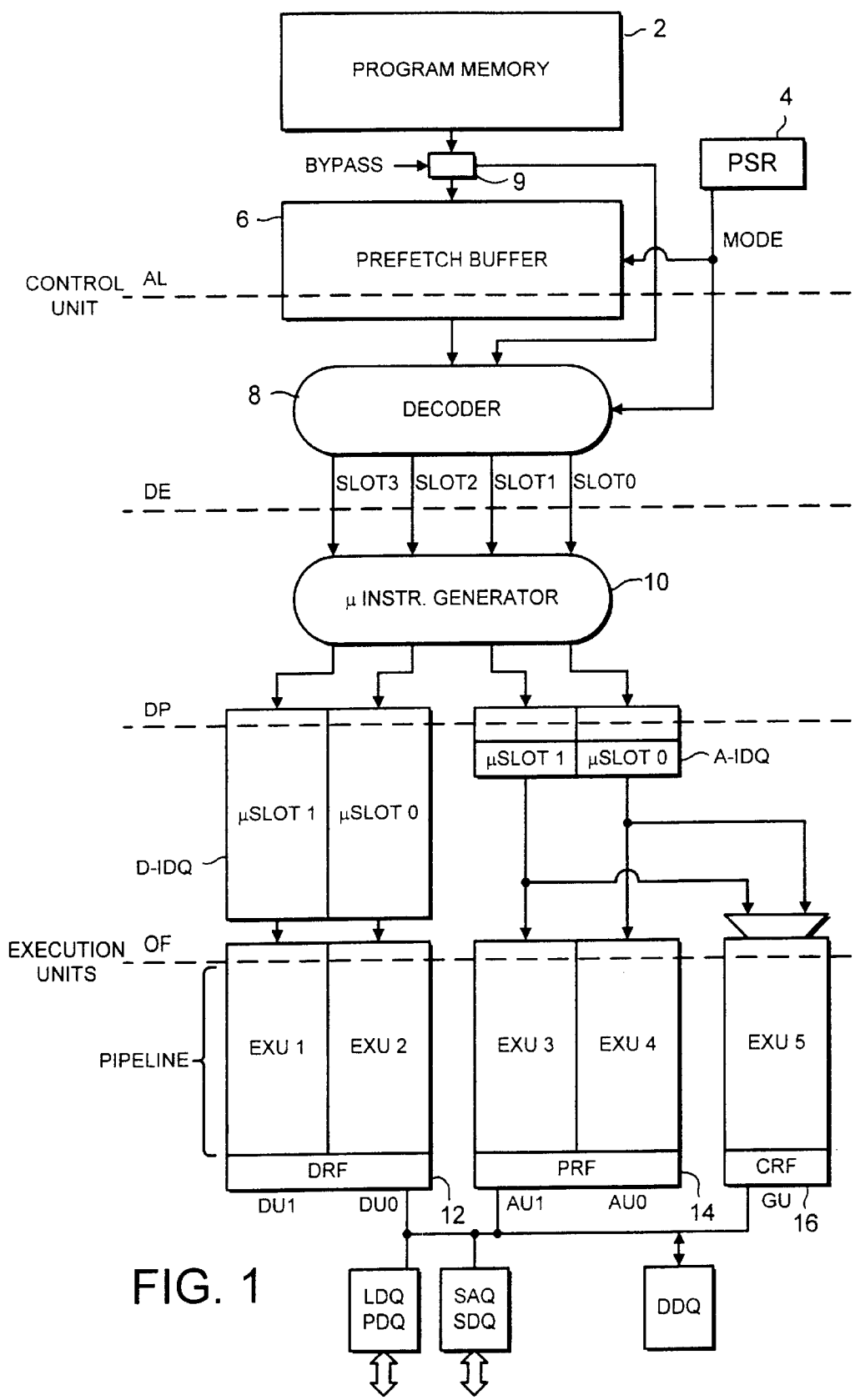
FIG. 1 is a block diagram of a computer system.
Figure 2:
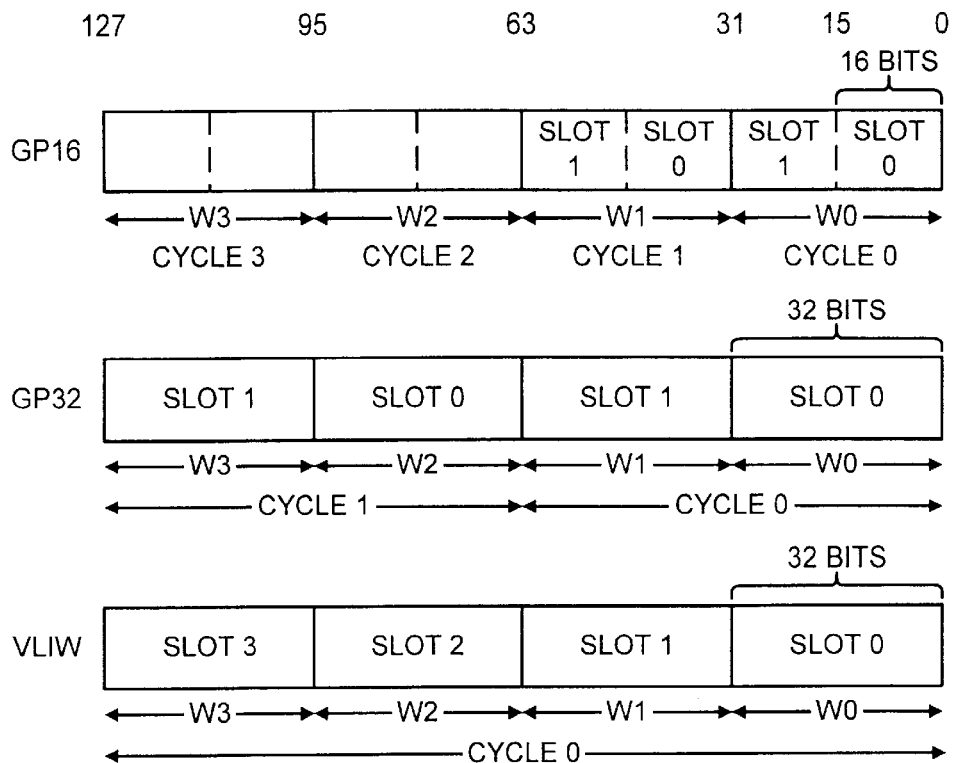
FIG. 2 illustrates three different instruction modes.

FIG. 1 illustrates relevant components of a computer system arranged for the parallel execution of a plurality of instructions and particularly suited to provide a high digital signal processing (DSP) performance. A program memory 2 holds instructions in one of a number of different instruction formats. The instruction formats are described in more detail in the following, but, in brief, program code can be written in instructions of any one or a combination of GP16 format, GP32 format and Very Long Instruction Word (VLIW) format. Thus, individual instructions in the program memory 2 can have a length of 16 bits or 32 bits. The computer system supports three different instruction modes as described with reference to FIG. 2 later. The instruction mode of the computer system is held in a process status register (PSR) 4 and is used to control operations of a prefetch buffer 6 and a decoder 8. A bypass mechanism 9 allows instructions to be supplied directly from the program memory 2 to the decoder 8 in some circumstances.

According to the instruction mode of the system, a number (2 or 4) of instructions are fetched from the program memory 2 either directly or via the prefetch buffer 6 and supplied to the decoder 8. Decoded instructions are supplied through a microinstruction generator 10 which generates microinstructions for a plurality of parallel execution units which are labelled EXU1, EXU2, EXU3, EXU4 and EXU5 in FIG. 1. Each execution unit is arranged as an execution pipeline and are arranged to have particular functions as follows. Execution units EXU1,EXU2 are data units which are arranged to execute microinstructions carrying arithmetic operations. They are also labelled DU1 and DU0 for reasons which are explained later. They share a common data register file 12. The execution units EXU3,EXU4 are address units and are used to execute microinstructions for memory accesses to a data memory (not shown). They are also labelled AU1,AU0 for reasons which are explained later. The address units share a common pointer register file 14. The remaining execution unit EXU5 is a general unit (GU) which share some resources with the address units but which includes its own control register file 16. A load data queue LDQ and pointer data queue PDQ provides a queuing mechanism for data and pointers from the data memory to the register files 12, 14, 16. A store address/data queue SAQ/SDQ provides a queuing mechanism for data and addresses awaiting access to memory. A data data queue DDQ allows queuing of data being transferred between the register files 12, 14, 16.

The data units, address units and general unit are fed from instruction queues which receive microinstructions from the microinstruction generator 10. Microinstructions are generated μslot 0, μslot 1 for the data units DU0,DU1 respectively and these microinstructions are held in the instruction data queue D-IDQ in readiness for supply to the pipelined units DU0,DU1. Likewise, microinstructions are generated in μslot 0 and μslot 1 for the address units and general unit AU1, AU0, GU. These microinstructions are held in an instruction data queue A-IDQ for the address units.

The prefetch buffer 6, decoder 8, microinstruction generator 10 and instruction queues D-IDQ, A-IDQ constitute a control unit for the computer system which operates in a pipelined manner. The stages of the pipeline are marked using dotted lines in FIG. 1 and are denoted as follows:

AL—align stage
DE—decode stage
DP—dispatch stage.

Similarly, each of the execution units are pipelined, although the details of the pipelining are not given here. The first stage in each pipeline however is an operand fetch (OF) stage which provides operands for use by the instructions in execution by the execution units.

The microinstruction generator 10 dispatches microinstructions to the queues D-IDQ, A-IDQ in a format which depends on the execution unit for which the microinstructions are intended. Thus, there is a microinstruction format for the data units, a microinstruction format for the address units and a microinstruction format for the general unit. In the present case, the format for the address unit and general unit are sufficiently similar that they are described as a common format herein. Microinstructions are generated in these formats, independently of the instruction mode used to write the program code. In order to understand this, the three different instruction modes of the machine will firstly be described with reference to FIG. 2.

According to a first instruction mode, a pair of 16 bit instructions are supplied during each machine cycle to the decoder 8 from the prefetch buffer 6. This pair is denoted slot0,slot1 in bit sequences w0,w1 etc. This is referred to herein as GP16 superscalar mode.

According to a second instruction mode, two instructions each having a length of 32 bits are supplied to the decoder from the prefetch buffer in each machine cycle, for example w0,w1 in CYCLE 0. This mode is referred to herein as GP32 superscalar mode.

According to a third instruction mode, four instructions w0,w1,w2,w3 each of 32 bits in length are supplied to the decoder in each machine cycle. This is referred to herein as VLIW mode.

In all modes, each fetch operation initiated to the program memory 2 retrieves an instruction word of 128 bits in length. Thus, in GPl6 mode, the instruction word comprises eight 16 bit instructions, paired as slot0,slot1 for each machine cycle. In GP32 and VLIW mode, the instruction word comprises four 32 bit instructions.

Thus, decoded instructions supplied from the decoder 8 to the microinstruction generator 10 are supplied by four possible channels, labelled slot0,slot1,slot2 and slot3. Slot2 and slot3 will only be used in VLIW mode. It will be appreciated that each program instruction can give rise to a number of microinstructions depending on the nature of the program instruction. Moreover, a single program instruction can give rise to microinstructions for both the data unit(s) and the address unit(s)/general units.

In GP16 and GP32 mode, only slot0 and slot1 are used during each machine cycle. These are used to generate microinstructions in μslot 0 and μslot 1 of either the data units or the address units/general unit. An instruction in slot 0 can give rise to a microinstruction in μslot 0 of the data units and/or μslot 0 of the address units. Similarly, an instruction in slot 1 can give rise to instructions in μslot 1 of the data units and/or address units. An exception to this general principle are expanded instructions (discussed later) which can generate a series of microinstructions on both slots.

In VLIW mode, slots 0 and 1 are used to generate microinstructions for μslot 0 and μslot 1 of either the A-IDQ or the load/store part of the D-IDQ, and slots 2 and 3 are used to generate microinstructions for μslot 0 and μslot 1 of the operative part of the D-IDQ. For programs written in VLIW mode, a grammar has to be followed such that only certain 32 bit instructions can be placed as part of the combination of four instructions to be fetched and decoded simultaneously. Thus, it is not possible to generate from a single VLIW word of four 32 bit instructions four instructions requiring use of the data unit. The most microinstructions that can be generated from a single VLIW word are two microinstructions requiring the parallel data units and two microinstructions requiring the parallel address units or general unit.

Table I gives some examples of types of operations defined by program instructions and the nature of microinstructions that are generated for the data units, address units and general unit to implement those instructions.

TABLE I

| Operation | Instruction | Explanation | Microinstruction DU | Microinstruction AU | Microinstruction GU |
|---|---|---|---|---|---|
| Data unit operation | DUop | DUop requires only DU | DUop | — | — |
| Address unit/ General unit operation | PRArith branch | PRArith requires only AU branch requires only GU | — — | PRArith — | — branch |
| Load operation | Load DR | AU send the effective address to the Data Memory Interface. DU read the returned data from the LDQ and update the Data Register. | read LDQ RN = LDQ | EA→DMC | — |
|  | Load PR/CR | AU send the effective address to the Data Memory Interface. Then, AU read the returned data from the LDQ and update the Pointer Register. | — — | EA→DMC PR/CR=LDQ | — |
| Store operation | Store DR | Au send the effective address to the Data Memory Interface. DU send the data to the SDQ. | Rn→SDQ | EA,BE→SAQ | — |
|  | Store PR/CR | AU send the effective address to the Data Memory Interface. AU send the data from the SDQ. | — | PR/CR→SDQ | — |
| Register to Register Move | Pm=Rn | AU send the Data to the DDQ AU read the data from the DDQ and update the Pointer Register | Rn→DDQ | Pm=DDQ | |
|  | Rm=Pn | AU send the Data to the PDQ. DU read the data from the PDQ and update the Data Register | Rm=PDQ | Pn→PDQ | |

Figure 3:
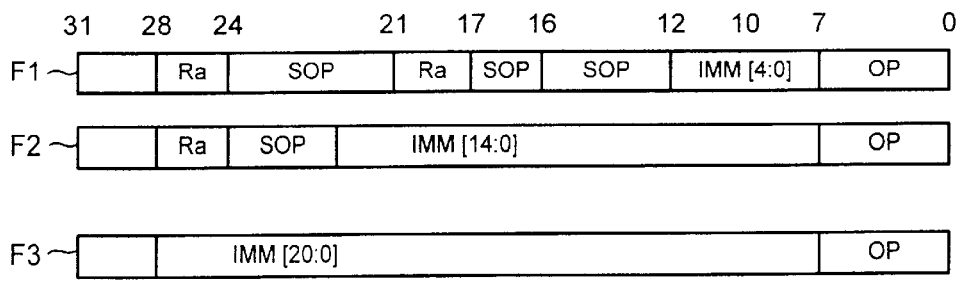
FIG. 3 illustrates different formats for instructions in GP32 mode.

FIG. 3 illustrates three exemplary formats for instructions in GP32 mode. Each instruction has a length of 32 bits, and a number of different fields depending on the format type. The three format examples are labelled F1,F2 and F3 in FIG. 3. All the formats share an 8 bit opcode field at bits 0 to 7. The formats F1,F2 and F3 each have a field for holding a so-called immediate value IMM. The immediate value IMM can have a variable length, as indicated for example as 5 bits in format F1, 15 bits in format F2 and 21 bits in format F3. The length of the immediate value is held in the opcode or subopcode. Depending on the length of the immediate value, remaining fields denote for example destination and source registers, Ra,Rb and additional sub-op fields SOP for holding additional parts of the opcode of the instruction beyond that which can be held in the 8 bit field at bits 0 to 7. Bits 28 to 31 hold guard values for use in guarded instruction execution which is not discussed herein.

Figure 4:
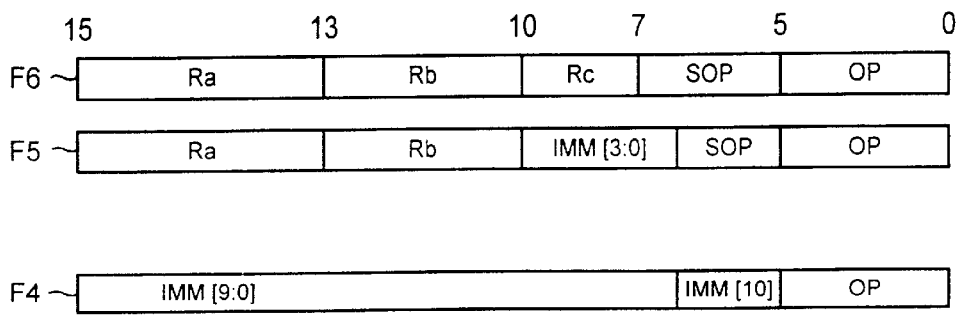
FIG. 4 illustrates different formats for instructions in GP16 mode.

FIG. 4 illustrates three exemplary instruction formats F4,F5 and F6 for GP16 mode. The formats share a 6 bit opcode field at bits 0 to 5. An immediate value IMM of varying length can be accommodated by the different formats, as illustrated in formats F4,F5. In addition there are fields for defining source and destination registers Ra,Rb,Rc for example, and additional sub-op fields SOP for expanding the opcode of the instruction, labelled SOP.

Figure 5:
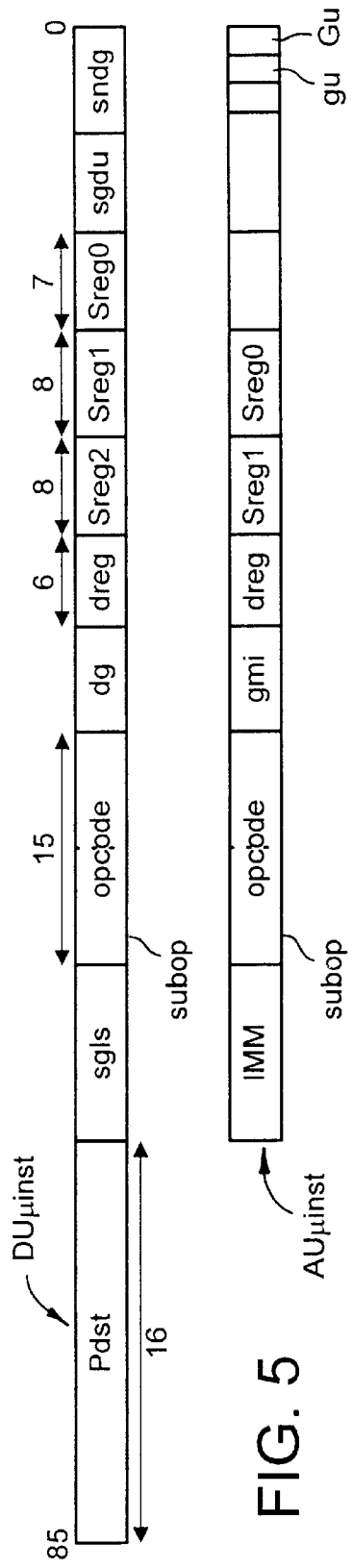
FIG. 5 illustrates formats for microinstructions for the data units and address units.

FIG. 5 illustrates formats for the data unit microinstruction and address unit microinstruction. As already mentioned, the format for the address unit microinstruction is very similar to that of the general unit microinstruction, the latter not therefore being described further herein.

The data unit microinstruction has a length of 86 bits containing a plurality of different fields of fixed length. Reading from right to left in FIG. 5, the first, second, seventh and ninth fields hold parameters relating to guarded instruction execution which is not discussed herein. The third field is a 7 bit field holding a register value Sreg0. The fourth and fifth fields are each 8 bit fields holding register values Sreg1,Sreg2 respectively. Each of these three fields can effectively define source registers for the microinstruction. The sixth field is a 6 bit field defining a data register. The eighth field is a 15 bit field holding the opcode defining the nature of the microinstruction. This has a separately definable subop section having a length of 9 bits. The last field is a load/store field which is 16 bits long and which identifies criteria for performing load or store operations as outlined in Table I.

Note that the data unit microinstruction has no dedicated field for holding the size and signage of an immediate value IMM. These parameters are held in the opcode and subopcode fields.

The address unit microinstruction AUµinst similarly has fixed length (7 bits) fields for defining two source registers Sreg0,Sreg1 and an 8 bit field defining a data register dreg. A 19 bit opcode field includes a fixed length (10 bits) separately identifiable sub-opcode field SUBOP. The remaining fields relate to guarded instruction execution. Also, the first two bits of the microinstruction indicates whether it is an address unit or general unit microinstruction. These bits are labelled au and gu in FIG. 5. The address unit microinstruction format has a dedicated fixed length field (IMM—5 bits) for holding bits identifying the size and signage of an immediate value. Note there are no fields uniquely dedicated to holding the immediate value itself.

The decoder 8 receives instructions in GP16, GP32 or VLIW mode and decodes them to supply data to the microinstruction generator 10. The microinstruction generator 10 uses this data to fill the fields according to the predetermined microinstruction formats illustrated in FIG. 5 to generate microinstructions for µslot 0, µslot 1 of the data units or address units/general unit respectively. As mentioned earlier, each program instruction can give rise to one or more microinstruction. Moreover, the microinstruction format is the same regardless of the instruction mode.

In determining the format for the microinstructions for the data units, address units and general unit, it is undesirable to allocate fields for immediate values which allow the maximum immediate value length to be accommodated. In many cases these fields would be unused, and their presence would increase the size of the queues A-IDQ,D-IDQ. Therefore, in the present computer system immediate values contained in instruction formats in the program memory 2 are "hidden" in fields within the microinstructions which are unused for performing the particular operation required by the program instruction.

An immediate value may be a numerical value of an operand for arithmetical operations which is sent directly from the microinstruction to the execution units.

Figure 6:
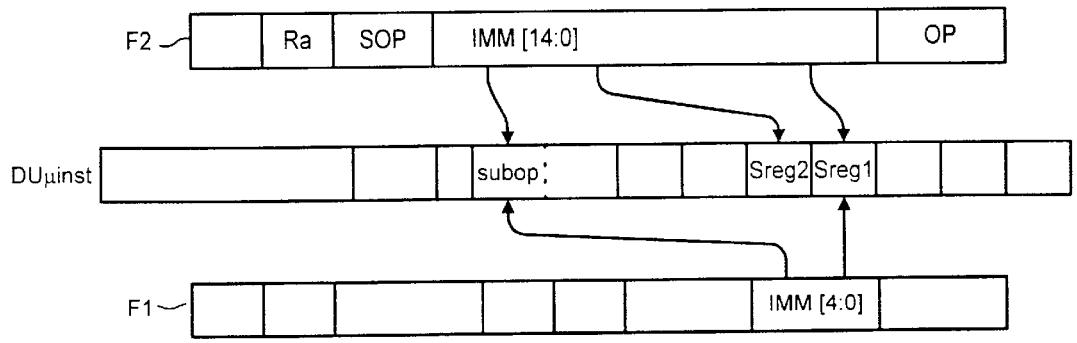
FIG. 6 illustrates how immediate values are hidden in a data unit microinstruction format.

Reference is now made to FIG. 6 by way of illustration of this principle. FIG. 6 illustrates formats F1 and F2 of GP32 (or VLIW) mode. The data unit microinstruction format is also illustrated. As illustrated by the arrows in FIG. 6, a 5 bit immediate value IMM[14:0] is "hidden" in the field Sreg1 and Subop of the data unit microinstruction. For the format F2, a 15 bit immediate value IMM[14:0] is "hidden" in fields Sreg1,Sreg2 and Subop. The allocation of certain bits of immediate values to predetermined fields in the data unit microinstruction format is predetermined so that the execution unit can always locate the full immediate value in a microinstruction. The allocation of bits of the immediate value to fields of the microinstruction formats is made by using fields of the microinstruction format that would not be filled by information in the particular instruction itself, because that field has been rendered redundant by use of the immediate value. Although not illustrated in FIG. 6, immediate values held in GP16 format instructions of the type illustrated in FIG. 4 can likewise be "hidden" in fields of the data unit microinstruction.

Figure 7:
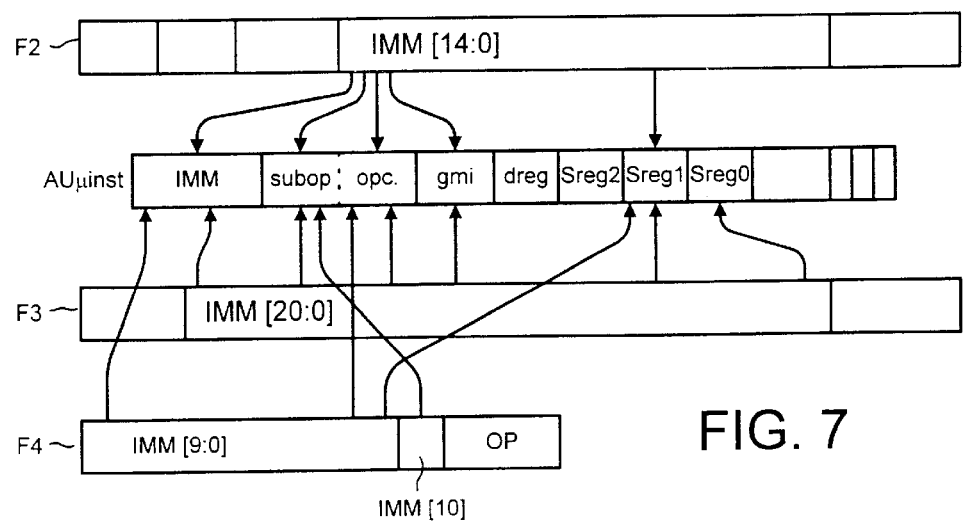
FIG. 7 illustrates how immediate values are hidden in an address unit microinstruction format.

FIG. 7 illustrates examples of immediate values being "hidden" in an address unit microinstruction format. The bits of the 15 bit immediate value of format F2 are held in the sub-op, opcode and gmi fields. The first 15 bits of a 20 bit immediate value are held in these fields. The remaining bits of the 21 bit immediate value held in the format F3 are held in the Sreg1 and Sreg0 fields. The 11 bit immediate value held in the GP16 format F4 is held in the sub-op field and the Sreg1 field.

In this way, it is possible to pass on immediate values held in program memory in the microinstructions which are supplied to the execution unit, notwithstanding a predetermined format for the data unit and address unit microinstructions which does not have specific fields for an immediate value.

What is claimed is:

1. A computer system comprising:
    a memory holding a computer program consisting of a sequence of program instructions, the format of the program instructions being selectable in dependence on an instruction mode of the computer system;
    a decoder arranged to receive and decode program instructions from the memory;
    a microinstruction generator responsive to information from the decoder to generate microinstructions according to a predetermined microinstruction format having a plurality of fields of respectively fixed lengths allocated to hold certain data derived from the program instructions, the microinstruction format being independent of the instruction mode of the computer system; and
    a plurality of parallel execution units for receiving and executing said microinstructions.

2. A computer system according to claim 1, wherein the execution units comprise a first set of execution pipelines for use in executing microinstructions needed for memory access operations and a second set of execution pipelines arranged to carry out arithmetic operations thereby providing decoupling of memory access operations from arithmetic operations.

3. A computer system according to claim 2, wherein there is a first microinstruction format for use for microinstructions supplied to the first set of execution pipelines and a second microinstruction format for use for microinstructions supplied to the second set of execution pipelines.

4. A computer system according to claim 1, wherein the program instructions held in the memory include instructions including an immediate value, and wherein that the microinstruction generator includes means for locating the immediate value in the microinstructions in one or more of said fixed length fields in place of the data normally allocated to said fields.

5. A computer system according to claim 4, wherein there are a plurality of different formats for program instructions held in the memory to accommodate immediate values of differing lengths.

6. A computer system according to claim 1, wherein the number of microinstructions generated in each machine cycle varies in dependence on the instruction mode of the computer system.

7. A computer system according to claim 1, which comprises a prefetcher for fetching instructions from the memory and supplying them to the decoder.

8. A computer system according to claim 7, which comprises means for controlling the prefetcher so that the number and length of instructions fetched from the memory in each machine cycle depends on the instruction mode of the computer system.

9. A computer system according to claim 1, wherein each execution unit has associated therewith an instruction queue for queuing microinstructions from the microinstruction generator.

10. A method of executing a computer program consisting of a sequence of program instructions held in a memory of a computer system, wherein the format of the program instructions is selectable in dependence on an instruction mode of the computer system, the method comprising:
    decoding said program instructions;
    generating microinstructions responsive to information from the decoded program instructions according to a predetermined microinstruction format having a plurality of fields of respectively fixed length allocated to hold certain data derived from the program instructions, the microistruction format being independent of the instruction mode of the computer system; and
    supplying said microinstructions to one or more of a plurality of parallel execution units for receiving and executing said microinstructions.

11. A method according to claim 10, wherein microinstructions of a first microinstruction format are supplied to a first set of execution pipelines for executing microinstructions needed for memory access operations, and microinstructions according to a second microinstruction format are supplied to a second set of execution pipelines arranged to carry out arithmetic operations.

12. A method according to claim 10 or 11, wherein the program instructions include instructions including an immediate value, the method comprising the step of locating the immediate value in the microinstructions in one or more of said fixed length fields in place of the data normally allocated to said fields.

13. A method according to claim 10 or 11, wherein the number and length of program instructions fetched from the memory in each machine cycle is dependent on the instruction mode of the computer system.

* * * * *